(12) United States Patent
Lu et al.

(10) Patent No.: US 7,136,731 B2
(45) Date of Patent: Nov. 14, 2006

(54) SYSTEM FOR DETERMINING VEHICULAR RELATIVE ROLL ANGLE DURING A POTENTIAL ROLLOVER EVENT

(75) Inventors: Jianbo Lu, Livonia, MI (US); Keith Glenn Mattson, Livonia, MI (US); Todd Allen Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 10/459,697

(22) Filed: Jun. 11, 2003

(65) Prior Publication Data

US 2004/0254707 A1    Dec. 16, 2004

(51) Int. Cl.
G06F 19/00 (2006.01)
(52) U.S. Cl. .......................................... 701/38; 701/70
(58) Field of Classification Search ............ 701/36–39, 701/45, 48, 70, 72; 702/127, 141, 150–153; 180/282
See application file for complete search history.

(56) References Cited

U.S. PATENT DOCUMENTS

| | | | |
|---|---|---|---|
| 2,917,126 A | 12/1959 | Phillips |
| 3,604,273 A | 9/1971 | Kwok et al. |
| 3,608,925 A | 9/1971 | Murphy |
| 3,899,028 A | 8/1975 | Morris et al. |
| 3,948,567 A | 4/1976 | Kasselmann et al. |
| 3,972,543 A | 8/1976 | Presley et al. |
| 4,023,864 A | 5/1977 | Lang et al. |
| RE30,550 E | 3/1981 | Reise |
| 4,480,714 A | 11/1984 | Yabuta et al. |
| 4,592,565 A | 6/1986 | Eagle |
| 4,597,462 A | 7/1986 | Sano et al. |
| 4,650,212 A | 3/1987 | Yoshimura |
| 4,679,808 A | 7/1987 | Ito et al. |
| 4,690,553 A | 9/1987 | Fukamizu et al. |
| 4,761,022 A | 8/1988 | Ohashi |
| 4,765,649 A | 8/1988 | Ikemoto et al. |
| 4,767,588 A | 8/1988 | Ito |
| 4,778,773 A | 10/1988 | Sukegawa |
| 4,809,183 A | 2/1989 | Eckert |
| 4,827,416 A | 5/1989 | Kawagoe et al. |
| 4,872,116 A | 10/1989 | Ito et al. |
| 4,888,696 A | 12/1989 | Akatsu et al. |
| 4,898,431 A | 2/1990 | Karnopp et al. |
| 4,930,082 A | 5/1990 | Harara et al. |
| 4,951,198 A | 8/1990 | Watanabe et al. |
| 4,960,292 A | 10/1990 | Sadler |
| 4,964,679 A | 10/1990 | Rath |

(Continued)

FOREIGN PATENT DOCUMENTS

DE    199 07 633    10/1999

(Continued)

OTHER PUBLICATIONS

A method for reducing on-road rollovers—anti-rollover braking, Thomas J. Wielenga, Dynamotive, LLC, International Congress and Exposition, Detroit, Michigan, Mar. 1-4, 1999.

(Continued)

Primary Examiner—Thu V. Nguyen
(74) Attorney, Agent, or Firm—Fredrick Owens (57) ABSTRACT

A control system (18) for an automotive vehicle (10) has a roll angular rate sensor (34) and a lateral accelerometer (32) that are used to determine the body roll angle of the vehicle when a rollover event has been sensed. A rollover event sensor (27) may be implemented physically or in combination with various types of suspension, load or other types of lifting determinations.

17 Claims, 3 Drawing Sheets

U.S. PATENT DOCUMENTS

| | | |
|---|---|---|
| 4,967,865 A | 11/1990 | Schindler |
| 4,976,330 A | 12/1990 | Matsumoto |
| 4,998,593 A | 3/1991 | Karnopp et al. |
| 5,033,770 A | 7/1991 | Kamimura et al. |
| 5,058,017 A | 10/1991 | Adachi et al. |
| 5,066,041 A | 11/1991 | Kindermann et al. |
| 5,088,040 A | 2/1992 | Matsuda et al. |
| 5,089,967 A | 2/1992 | Haseda et al. |
| 5,163,319 A | 11/1992 | Spies et al. |
| 5,200,896 A | 4/1993 | Sato et al. |
| 5,208,749 A | 5/1993 | Adachi et al. |
| 5,224,765 A | 7/1993 | Matsuda |
| 5,228,757 A | 7/1993 | Ito et al. |
| 5,239,868 A | 8/1993 | Takenaka et al. |
| 5,247,466 A | 9/1993 | Shimada et al. |
| 5,261,503 A | 11/1993 | Yasui |
| 5,265,020 A | 11/1993 | Nakayama |
| 5,278,761 A | 1/1994 | Ander et al. |
| 5,282,134 A | 1/1994 | Gioutsos et al. |
| 5,311,431 A | 5/1994 | Cao et al. |
| 5,324,102 A | 6/1994 | Roll et al. |
| 5,335,176 A | 8/1994 | Nakamura |
| 5,365,439 A | 11/1994 | Momose et al. |
| 5,370,199 A | 12/1994 | Akuta et al. |
| 5,408,411 A | 4/1995 | Nakamura et al. |
| 5,446,658 A | 8/1995 | Pastor et al. |
| 5,510,989 A | 4/1996 | Zabler et al. |
| 5,548,536 A | 8/1996 | Ammon |
| 5,549,328 A | 8/1996 | Cubalchini |
| 5,579,245 A | 11/1996 | Kato |
| 5,598,335 A | 1/1997 | You |
| 5,602,734 A | 2/1997 | Kithil |
| 5,610,575 A | 3/1997 | Gioutsos |
| 5,627,756 A | 5/1997 | Fukada et al. |
| 5,634,698 A | 6/1997 | Cao et al. |
| 5,640,324 A | 6/1997 | Inagaki |
| 5,648,903 A | 7/1997 | Liubakka |
| 5,671,982 A | 9/1997 | Wanke |
| 5,676,433 A | 10/1997 | Inagaki et al. |
| 5,694,319 A | 12/1997 | Suissa et al. |
| 5,703,776 A | 12/1997 | Soung |
| 5,707,117 A | 1/1998 | Hu et al. |
| 5,707,120 A | 1/1998 | Monzaki et al. |
| 5,720,533 A | 2/1998 | Pastor et al. |
| 5,723,782 A | 3/1998 | Bolles, Jr. |
| 5,732,377 A | 3/1998 | Eckert |
| 5,732,378 A | 3/1998 | Eckert et al. |
| 5,732,379 A | 3/1998 | Eckert et al. |
| 5,736,939 A | 4/1998 | Corcoran |
| 5,737,224 A | 4/1998 | Jeenicke et al. |
| 5,740,041 A | 4/1998 | Iyoda |
| 5,742,918 A | 4/1998 | Ashrafi et al. |
| 5,742,919 A | 4/1998 | Ashrafi et al. |
| 5,762,406 A | 6/1998 | Yasui et al. |
| 5,782,543 A | 7/1998 | Monzaki et al. |
| 5,787,375 A | 7/1998 | Madau et al. |
| 5,801,647 A | 9/1998 | Survo et al. |
| 5,809,434 A | 9/1998 | Ashrafi et al. |
| 5,816,670 A | 10/1998 | Yamada et al. |
| 5,825,284 A | 10/1998 | Dunwoody et al. |
| 5,857,535 A | 1/1999 | Brooks |
| 5,869,943 A | 2/1999 | Nakashima et al. |
| 5,878,357 A | 3/1999 | Sivashankar et al. |
| 5,893,896 A | 4/1999 | Imamura et al. |
| 5,925,083 A | 7/1999 | Ackermann |
| 5,931,546 A | 8/1999 | Nakashima et al. |
| 5,944,137 A | 8/1999 | Moser et al. |
| 5,944,392 A | 8/1999 | Tachihata et al. |
| 5,946,644 A | 8/1999 | Cowan et al. |
| 5,964,819 A | 10/1999 | Naito |
| 5,971,503 A | 10/1999 | Joyce et al. |
| 6,002,974 A | 12/1999 | Schiffmann |
| 6,002,975 A | 12/1999 | Schiffmann et al. |
| 6,026,926 A | 2/2000 | Noro et al. |
| 6,038,495 A | 3/2000 | Schiffmann |
| 6,040,916 A | 3/2000 | Griesinger |
| 6,050,360 A | 4/2000 | Pattok et al. |
| 6,055,472 A | 4/2000 | Breunig et al. |
| 6,062,336 A | 5/2000 | Amberkar et al. |
| 6,065,558 A | 5/2000 | Wielenga |
| 6,073,065 A | 6/2000 | Brown et al. |
| 6,079,513 A | 6/2000 | Nishizaki et al. |
| 6,081,761 A | 6/2000 | Harada et al. |
| 6,085,860 A | 7/2000 | Hackl et al. |
| 6,086,168 A | 7/2000 | Rump |
| 6,089,344 A | 7/2000 | Baughn et al. |
| 6,104,284 A | 8/2000 | Otsuka |
| 6,122,568 A | 9/2000 | Madau et al. |
| 6,122,584 A | 9/2000 | Lin et al. |
| 6,129,172 A | 10/2000 | Yoshida et al. |
| 6,141,604 A | 10/2000 | Mattes et al. |
| 6,141,605 A | 10/2000 | Joyce |
| 6,144,904 A | 11/2000 | Tseng |
| 6,149,251 A | 11/2000 | Wuerth et al. |
| 6,161,905 A | 12/2000 | Hac et al. |
| 6,169,939 B1 | 1/2001 | Raad et al. |
| 6,176,555 B1 | 1/2001 | Semsey |
| 6,178,375 B1 | 1/2001 | Breunig |
| 6,179,310 B1 | 1/2001 | Clare et al. |
| 6,179,394 B1 | 1/2001 | Browalski et al. |
| 6,184,637 B1 | 2/2001 | Yamawaki et al. |
| 6,185,485 B1 | 2/2001 | Ashrafi et al. |
| 6,186,267 B1 | 2/2001 | Hackl et al. |
| 6,192,305 B1 | 2/2001 | Schiffmann |
| 6,195,606 B1 | 2/2001 | Barta et al. |
| 6,198,988 B1 | 3/2001 | Tseng |
| 6,202,009 B1 | 3/2001 | Tseng |
| 6,202,020 B1 | 3/2001 | Kyrtsos |
| 6,206,383 B1 | 3/2001 | Burdock |
| 6,219,604 B1 | 4/2001 | Dilger et al. |
| 6,223,114 B1 | 4/2001 | Boros et al. |
| 6,226,579 B1 | 5/2001 | Hackl et al. |
| 6,233,510 B1 | 5/2001 | Platner et al. |
| 6,263,261 B1 | 7/2001 | Brown et al. |
| 6,266,596 B1 | 7/2001 | Hartman et al. |
| 6,272,420 B1 | 8/2001 | Schramm et al. |
| 6,278,930 B1 | 8/2001 | Yamada et al. |
| 6,282,471 B1 | 8/2001 | Burdock et al. |
| 6,282,472 B1 | 8/2001 | Jones et al. |
| 6,282,474 B1 | 8/2001 | Chou et al. |
| 6,292,734 B1 | 9/2001 | Murakami et al. |
| 6,292,759 B1 | 9/2001 | Schiffmann |
| 6,311,111 B1 | 10/2001 | Leimbach et al. |
| 6,314,329 B1 | 11/2001 | Madau et al. |
| 6,315,373 B1 | 11/2001 | Yamada et al. |
| 6,321,141 B1 | 11/2001 | Leimbach |
| 6,324,446 B1 | 11/2001 | Brown et al. |
| 6,324,458 B1 | 11/2001 | Takagi et al. |
| 6,330,522 B1 | 12/2001 | Takeuchi |
| 6,332,104 B1 | 12/2001 | Brown et al. |
| 6,338,012 B1 | 1/2002 | Brown et al. |
| 6,349,247 B1 | 2/2002 | Schramm et al. |
| 6,351,694 B1 | 2/2002 | Tseng et al. |
| 6,352,318 B1 | 3/2002 | Hosomi et al. |
| 6,356,188 B1 | 3/2002 | Meyers et al. |
| 6,370,938 B1 | 4/2002 | Leimbach et al. |
| 6,394,240 B1 | 5/2002 | Barwick |
| 6,397,127 B1 | 5/2002 | Meyers et al. |
| 6,419,240 B1 | 7/2002 | Burdock et al. |
| 6,428,118 B1 | 8/2002 | Blosch |
| 6,438,464 B1 | 8/2002 | Woywod et al. |
| 6,477,480 B1 | 11/2002 | Tseng et al. |
| 6,496,758 B1 | 12/2002 | Rhode et al. |
| 6,496,763 B1 | 12/2002 | Griessbach |

| | | |
|---|---|---|
| 6,498,976 B1 | 12/2002 | Ehlbeck et al. |
| 6,547,022 B1 | 4/2003 | Hosomi et al. |
| 6,554,293 B1 | 4/2003 | Fennel et al. |
| 6,556,908 B1 | 4/2003 | Lu et al. |
| 6,559,634 B1 | 5/2003 | Yamada |
| 2002/0014799 A1 | 2/2002 | Nagae |
| 2002/0040268 A1 | 4/2002 | Yamada et al. |
| 2002/0056582 A1 | 5/2002 | Chubb |
| 2002/0075139 A1 | 6/2002 | Yamamoto et al. |
| 2002/0096003 A1 | 7/2002 | Yamada et al. |
| 2002/0128795 A1* | 9/2002 | Schiffmann .................. 702/151 |
| 2002/0139599 A1 | 10/2002 | Lu |
| 2003/0055549 A1* | 3/2003 | Barta et al. ................... 701/70 |

FOREIGN PATENT DOCUMENTS

| | | |
|---|---|---|
| EP | 0 662 601 | 7/1995 |
| GB | 2257403 | 1/1993 |
| GB | 2 342 078 | 4/2000 |
| SU | 816849 | 3/1981 |

OTHER PUBLICATIONS

Eger, R., Majjad, R., Naser, N., "Rollover simulation based on a nonlinear model", SAE 98020.

Nalecz, A.G., Bindemann, A.C., Brewer H.K., "Dynamic analysis of vehicle rollover", 12$^{th}$ International Conference on Experimental Safety Vehicles, Goteborg, Sweden, May 29-Jun. 1, 1989.

Niii, N., Nishijima, Y., Nakagaw, K., "rollover analysis method of a large-size bus", JSAE 9540020, 1995.

Eger, R., Kiencke, U., "Modeling of rollover sequences", Control Engineering Practice 11 (2003) 209-216.

* cited by examiner

SYSTEM FOR DETERMINING VEHICULAR RELATIVE ROLL ANGLE DURING A POTENTIAL ROLLOVER EVENT

TECHNICAL FIELD

The present invention relates generally to a control apparatus for controlling a system of an automotive vehicle in response to sensed dynamic behavior, and more specifically, to a method and apparatus for controlling the system of the vehicle by determining the roll angle of the vehicle relative to the road surface.

BACKGROUND OF THE INVENTION

Dynamic control systems for automotive vehicles have recently begun to be offered on various products. Dynamic control systems typically control the yaw of the vehicle by controlling the braking effort at the various wheels of the vehicle. Yaw control systems typically compare the desired direction of the vehicle based upon the steering wheel angle and the direction of travel. By regulating the amount of braking at each corner of the vehicle, the desired direction of travel may be maintained. Typically, the dynamic control systems do not address roll of the vehicle. For high profile vehicles in particular, it would be desirable to control the rollover characteristic of the vehicle to maintain the vehicle position with respect to the road. That is, it is desirable to maintain contact of each of the four tires of the vehicle on the road.

In vehicle rollover control, it is desired to alter the vehicle attitude such that its motion along the roll direction is prevented from achieving a predetermined limit (rollover limit) with the aid of the actuation from the available active systems such as controllable brake system, steering system and suspension system. Although the vehicle attitude is well defined, direct measurement is usually impossible.

During a potential vehicular rollover event, one side of the wheels start lifting, and the roll center of the vehicle shifted to the contact patch of the remaining tires. This shifted roll center increases the roll inertia of moment of the vehicle, hence reduces the roll acceleration of the vehicle. However, the roll attitude could still increase rapidly. The corresponding roll motion when the vehicle starts side lifting deviates from the roll motion during normal driving condition. Therefore accurate characterization of the roll angle during potential rollover events is needed, since the feedback control for achieving rollover prevention is directly related to the vehicle roll angle. One way in which to determine roll angle is found in U.S. patent (application Ser. No. 10/091,264) entitled "Attitude Sensing System For An Automotive Vehicle Relative To The Road" filed Mar. 4, 2002. The system in that application is particularly suitable in situations where the four tires of a vehicle are contacting the road surface, i.e., when the vehicle does not have side lifting. However, the sensed relative roll angle in that system gets saturated due to various system limitations when the vehicle roll angle increases so as to cause side lifting although the actual relative roll angle of the vehicle is growing rapidly.

Many studies have been conducted for analyzing vehicular rollovers. There are many papers dealing with modeling roll dynamics when the vehicle has side lifting. In the reference "Modeling of rollover sequences," (by Ralf Eger and Uwe Kiencke, Control Engineering Practice, vol. 11, pp 209–216, 2003) the rollover sequence during an impact is studied when the vehicle slides laterally into a rigid barrier. A multi-body rollover model with nonlinear suspensions is used. In order to simulate the vehicle rollover dynamics, the vehicle initial states right before impact, such as the vehicle lateral velocity, are required. In the paper "Dynamic Analysis Of Vehicle Rollover," The $12^{th}$ International Conference on Experimental Safety Vehicles, Goteborg, Sweden, May 29–Jun. 1, 1989, the rollover dynamics are studied for determining the influence of design parameters on the vehicle responses. In "Rollover Analysis Method Of A Large-Size Bus," JSAE 9540020, 1995, by N. Niii, Y. Nishijima and K. Nakagawa, how to accurately simulate the rollover dynamics for a large bus is described.

Although the above-cited references help model and analyze the roll dynamics during potential rollover events, they have less practical application in active rollover control implementations. One reason is that the full car dynamics or detailed multi-body dynamics are too complicated to be implemented in feedback control algorithms. The second reason is that the initial condition or vehicle states right before the vehicular rollover are usually unknown and sometimes might not be able to be identified through the available sensor signals. Furthermore, certain variables used in the aforementioned analysis cannot be estimated by the available sensors.

It would therefore be desirable to provide a practical and implementation-ready system for determining the roll angle of the vehicle with respect to the road surface during potential rollover events.

SUMMARY OF THE INVENTION

The present invention seeks to determine the relative roll angle of the vehicle during a potential rollover event. A potential rollover event is defined as the case where one side of the vehicle starts lifting. This lifting is either controllable by activating available actuators or non-controllable. The controllable lifting is eventually eliminated. The sensing system tries to capture the vehicle roll angle (a quantitative measure of the vehicle side lifting) when the vehicle starts side lifting. It uses a lateral acceleration sensor and a roll angular rate sensor and the information regarding if the vehicle has a lifting trend on one side of its wheels.

In one aspect of the invention, a control system for an automotive vehicle has a roll angular rate sensor and a lateral accelerometer that are used to determine the body roll angle of the vehicle when a rollover event has been sensed. A rollover event sensor may be implemented physically or in combination with various types of suspension, load or other types of lifting determinations. One example of such a wheel lifting determination can be found in Ford U.S. Pat. No. 6,356,188 and several other Ford invention disclosures using the available sensed signals and the available calculated signals. The output from such a wheel lifting determination unit can be used qualitatively to detect, monitor and predict a potential rollover event. If the qualitative determination indicates a positive flag for potential rollovers, a quantitative determination of how severe the rollover might be through estimated vehicular roll angle is conducted. Such a quantitative estimation of a rollover may be determined by the present invention.

In a further aspect of the invention, a method of operating a control system of a vehicle comprises sensing a potential rollover event, measuring a lateral acceleration of the vehicle, measuring a roll angular rate of the vehicle, and determining a vehicle body angle in response to the lateral acceleration and the roll angular rate.

One advantage of the invention is that by providing such a system an improved determination of roll angle after a lifting or loading event may be determined. The amount of evasive active control actions such as braking and steering may correspondingly be increased in order to control the potential rollover in its initial trending stage such that the rollover is eventually eliminated.

Other advantages and features of the present invention will become apparent when viewed in light of the detailed description of the preferred embodiment when taken in conjunction with the attached drawings and appended claims.

DESCRIPTION OF THE PREFERRED EMBODIMENT

In the following figures the same reference numerals will be used to identify the same components. The present invention is preferably used in conjunction with a rollover control system for a vehicle. However, the present invention may also be used with a deployment device such as an airbag or roll bar. The present invention will be discussed below in terms of preferred embodiments relating to an automotive vehicle moving in a three-dimensional road terrain.

Figure 1:
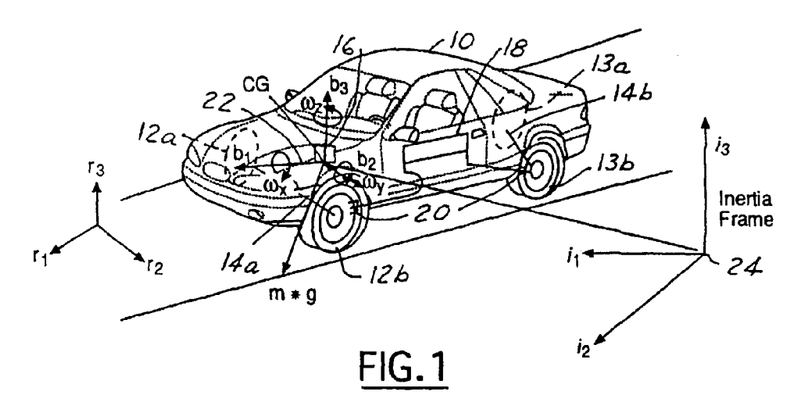
FIG. 1 is a diagrammatic view of a vehicle with variable vectors and coordinator frames according to the present invention.

Referring to FIG. 1, an automotive vehicle 10 with a safety system of the present invention is illustrated with the various forces and moments thereon during a rollover condition. Vehicle 10 has front right and front left tires 12a and 12b and rear right tires 13a and left rear tires 13b respectively. The vehicle 10 may also have a number of different types of front steering systems 14a and rear steering systems 14b including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels or vice versa. Generally, the vehicle has a weight represented as Mg at the center of gravity of the vehicle, where g=9.8 m/s² and M is the total mass of the vehicle.

As mentioned above, the system may also be used with active/semi-active suspension systems, anti-roll bar or other safety devices deployed or activated upon sensing predetermined dynamic conditions of the vehicle.

The sensing system 16 is coupled to a control system 18. The sensing system 16 may comprise many different sensors including the sensor set typically found in a rollover control system (including lateral accelerometer, yaw rate sensor, steering angle sensor and wheel speed sensor) together with a roll rate sensor and a longitudinal accelerometer. The various sensors will be further described below. The present invention is directed to using the roll angular rate sensor and the lateral acceleration sensor to determine the roll angle after a lifting or load shifting event, which can be detected by wheel lifting detection methods such as the one used in Ford U.S. Pat. No. 6,356,188. Thus, the remaining sensors may be used by the control system in various determinations such as prior to a lifting event. The wheel speed sensors 20 are mounted at each corner of the vehicle, and the rest of the sensors of sensing system 16 are preferably mounted directly on the center of gravity of the vehicle body, along the directions x,y and z shown in FIG. 1. As those skilled in the art will recognize, the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate and $\omega_z$ for the yaw rate. The present invention calculations preferably may take place in an inertial frame 24 that may be derived from the body frame 22 as described below.

The angular rate sensors and the accelerometers are mounted on the vehicle car body along the body frame directions $b_1$, $b_2$ and $b_3$, which are the x-y-z axes of the sprung mass of the vehicle.

The longitudinal acceleration sensor is mounted on the car body located at the center of gravity, with its sensing direction along $b_1$-axis, whose output is denoted as $a_x$. The lateral acceleration sensor is mounted on the car body located at the center of gravity, with its sensing direction along $b_2$-axis, whose output is denoted as $a_y$.

The other frame used in the following discussion includes the road frame, as depicted in FIG. 1. The road frame system $r_1r_2r_3$ is fixed on the driven road surface, where the $r_3$ axis is along the average road normal direction computed from the normal directions of the four-tire/road contact patches.

In the following discussion, the Euler angles of the body frame $b_1b_2b_3$ with respect to the road frame $r_1r_2r_3$ are denoted as $\theta_{xbr}$, $\theta_{ybr}$ and $\theta_{zbr}$, which are also called the relative Euler angles.

The present invention estimates the relative Euler angles $\theta_{xbr}$ and $\theta_{ybr}$ based on the available sensor signals and the signals calculated form the measured values.

Figure 2:
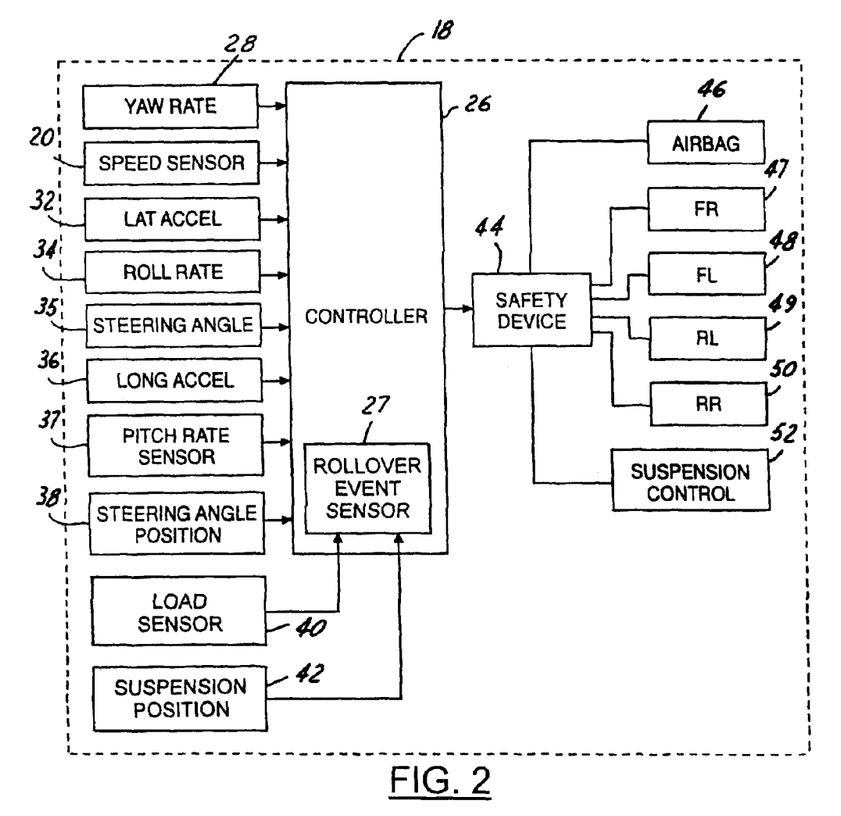
FIG. 2 is a block diagram of a stability system according to the present invention.

Referring now to FIG. 2, roll stability control system 18 is illustrated in further detail having a controller 26 used for receiving information from a number of sensors which may include a yaw rate sensor 28, a speed sensor 20, a lateral acceleration sensor 32, a roll angular rate sensor 34, a steering angle sensor 35, a longitudinal acceleration sensor 36, a pitch rate sensor 37, steering angle position sensor 39, suspension load sensor 40 and suspension position sensor 41.

Controller 26 may include a rollover event sensor 27 that may be included in software or include at least one autonomous sensor such as sensors 40 and 41. The rollover event sensor 27 generates a potential rollover signal due to a wheel lift or load shifting of the vehicle. Such a condition may be a condition precedent for the operation of the roll angle determination of the present invention. The potential rollover signal may be generated in response to sensors 40 or 41 alone or in combination with other vehicle sensors or using at least one or more sensors 28–39.

In the preferred embodiment only two sensors, the roll angular rate and the lateral acceleration, are used to determine the roll angle after a potential rollover has been sensed. The other sensor may be used for wheel lift detection, confirmation or in different parts of the control system.

In the preferred embodiment the sensors are located at the center of gravity of the vehicle. Those skilled in the art will recognize that the sensor may also be located off the center of gravity and translated equivalently thereto.

Lateral acceleration, roll orientation and speed may be obtained using a global positioning system (GPS). Based upon inputs from the sensors, controller 26 may control a safety device 44. Depending on the desired sensitivity of the system and various other factors, not all the sensors 28–42 may be used in a commercial embodiment. Safety device 44 may control an airbag 46 or a steering actuator or braking actuator at one or more of the wheels 47, 48, 49, 50 of the vehicle. Also, other vehicle components such as a suspension control 52 may be used to adjust the suspension to prevent rollover.

Roll angular rate sensor 34 and pitch rate sensor 37 may sense the roll condition or lifting of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 and pitch rate sensor 37 may also sense the roll condition or lifting based on sensing the linear or rotational relative displacement or displacement velocity of one or more of the suspension chassis components. This may be in addition to or in combination with suspension position sensor 42. The position sensor 42, roll rate sensor 34 and/or the pitch rate sensor 37 may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition or lifting may also be sensed by sensing the force or torque associated with the loading condition of one or more suspension or chassis components including a pressure transducer in an act of air suspension, a shock absorber sensor such as a load sensor 40, a strain gauge, the steering system absolute or relative motor load, the steering system pressure of the hydraulic lines, a tire lateral force sensor or sensors, a longitudinal tire force sensor, a vertical tire force sensor or a tire sidewall torsion sensor.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical-based speed sensor.

Safety device 44 may control the position of the front right wheel actuator 47, the front left wheel actuator 48, the rear left wheel actuator 49, and the right rear wheel actuator 50. Although as described above, two or more of the actuators may be simultaneously controlled. For example, in a rack-and-pinion system, the two wheels coupled thereto are simultaneously controlled. Based on the inputs from sensors 28 through 42, controller 26 determines a roll condition and controls the steering position of the wheels.

Speed sensor 30 may be one of a variety of speed sensors known to those skilled in the art. For example, a suitable speed sensor may include a sensor at every wheel that is averaged by controller 26. Preferably, the controller translates the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. Speed may also be obtained from a transmission sensor. For example, if speed is determined while speeding up or braking around a corner, the lowest or highest wheel speed may not be used because of its error. Also, a transmission sensor may be used to determine vehicle speed.

Load sensor 40 may be a load cell coupled to one or more suspension components. By measuring the stress, strain or weight on the load sensor a shifting of the load can be determined.

Figure 3:
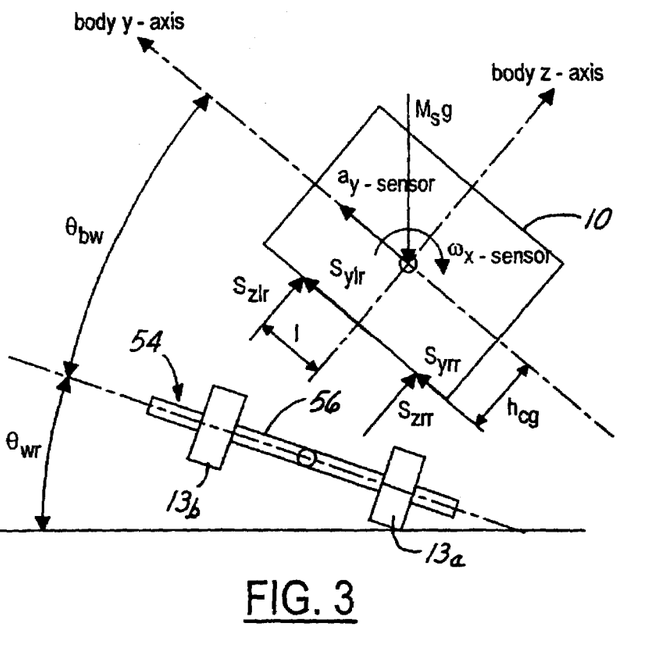
FIG. 3 is a diagrammatic end view of a vehicle showing the displacement of the vehicle body and axle relative to road surface.
Figure 4:
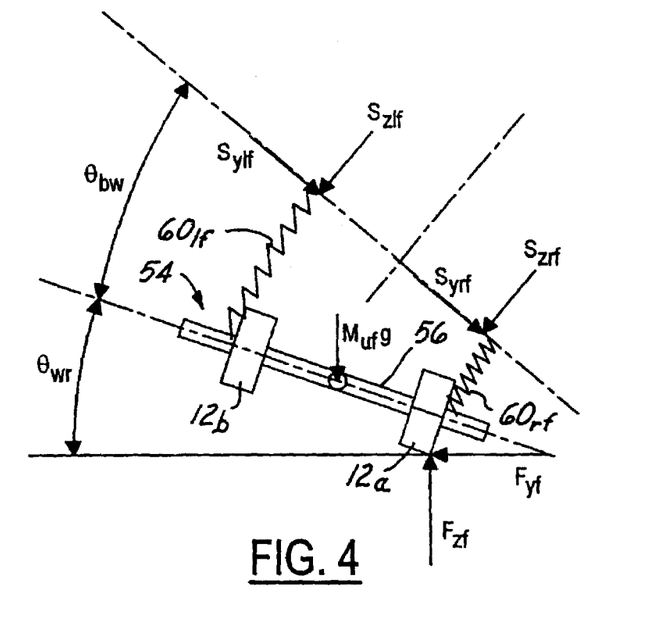
FIG. 4 is a diagrammatic view showing the forces applied to the front wheel/tire/suspension assembly during a potential rollover event.
Figure 5:
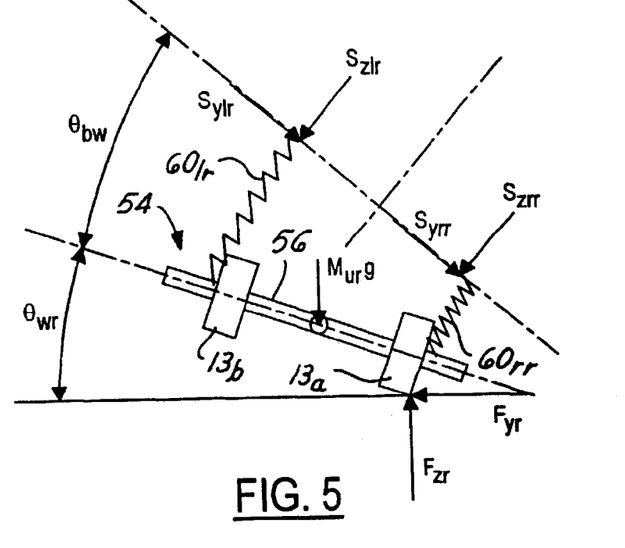
FIG. 5 is a diagrammatic view showing the forces applied to the rear wheel/tire/suspension assembly during a potential rollover event.

Referring now to FIGS. 3, 4 and 5, the present invention will be discussed below in terms of preferred embodiments relating to an automotive vehicle having a wheel/tire/suspension assembly 54 during potential rollover events where one side of the vehicle is lifted or one side of the vehicle tires lose contact with the road surface or one side of the tires do not carry normal loadings. The wheel/tire/suspension assembly has an axle 56. Although a physical axle may not be present, axle is a term used for the common axis of the front or rear wheels.

The sensing system uses the lateral acceleration sensor 32 and the roll angular rate sensor 34. The lateral acceleration sensor 32 is used to measure the total lateral acceleration of the center of gravity of the vehicle body, and the roll rate sensor 32 measures the vehicle body roll angular rate.

The vehicle body is connected with the wheel/tire assemblies through suspensions $60_{lr}$, $60_{rr}$, $60_{lf}$, and $60_{rf}$. The tire forces are transferred to the vehicle body through the suspensions 60. Those forces can be projected along the vehicle body-fixed y- and z-axes. The suspension forces projected along the body-fixed y axis (or body-fixed lateral direction) are denoted as $S_{ylf}, S_{yrf}, S_{ylr}, S_{yrr}$ at the left-front, right-front, left-rear and right-rear corners; the suspension forces projected along the body-fixed z axis (or body-fixed vertical direction) as $S_{zlf}, S_{zrf}, S_{zlr}, S_{zrr}$. The total lateral force applied to the vehicle body along the body-fixed lateral axis is $S_y$, i.e.

$$S_y = S_{ylf} + S_{yrf} + S_{ylr} + S_{yrr}. \tag{1}$$

The vehicle body has roll angular displacement due to the suspension forces and the vehicle roll accelerations. The roll angular rate of the vehicle body is $\omega_x$. Around center of gravity of the vehicle body, the suspension forces-induced roll moment around the vehicle center of gravity (c.g.) needs to match the inertia moment from this $\omega_x$. The suspension forces-induced roll moment around the c.g. has two terms:

the roll moment $M_{susp-vert}$ due to the vertical suspension forces $S_{zlf}, S_{zrf}, S_{zlr}, S_{zrr}$;

the roll moment $M_{susp-lat}$ due to the total lateral suspension force $S_y$.

From FIG. 5, the following expressions for $M_{susp-vert}$ and $M_{susp-lat}$ may be obtained $$M_{susp-vert} = (S_{zrf} - S_{zlf} + S_{zrr} - S_{zlr})l.$$

$$M_{susp-lat} = S_y h_{cg} \tag{2}$$

The vehicle body roll angular rate must satisfy the following $$I_x \dot{\omega}_x = M_{susp-vert} + M_{susp-lat} \tag{3}$$

where $I_x$ is the vehicle body roll moment of inertia around the c.g. of the vehicle body. If the suspension resultant roll stiffness and roll damping rates (including anti-roll-bars, suspensions, etc.) are respectively defined as $K_{roll}$ and $D_{roll}$, and $\theta_{bw}$ as the relative angular displacement between the vehicle body and the average wheel axle, then the roll moment due to vertical suspension forces $M_{susp-vert}$ can be further expressed as $$M_{susp-vert} = -K_{roll}\theta_{bw} - D_{roll}\dot{\theta}_{bw}. \quad (4)$$

The roll moment due to lateral suspension forces $M_{susp-lat}$ needs to be further defined so that the roll angular rate sensors and the lateral accelerometer may be used. The longitudinal and lateral velocities of the c.g. of the vehicle body are $v_x$ and $v_y$, which are measured along body-fixed x- and y-axis respectively, and $\omega_z$ is the yaw rate of the vehicle. The lateral dynamics of the vehicle body will satisfy the following equation of motion based on Newton's law:

$$M_s(\dot{v}_y + \omega_z v_x) = S_y + M_s g \sin(\theta_{bw} + \theta_{wr}) \quad (5)$$

where, $\theta_{wr}$ is the relative angular displacement between the wheel axle and the road surface, (or the departure angle of the wheel axle from the road surface), $M_s$ is the vehicle body mass (or the sprung mass of the vehicle). Solving $S_y$ from (5) and plugging $S_y$ into the second equation of (2) leads to $$M_{susp-lat} = M_s(\dot{v}_y + \omega_z v_x)h_{cg} - M_s g \sin(\theta_{bw} + \theta_{wr})h_{cg}. \quad (6)$$

The dynamic equation depicts the wheel axle departure angle from the road surface. There are two wheel sets, one on the front (FIG. 4) and one on the rear (FIG. 5). Due to the differences in front and rear suspensions and inertias, there are slight differences between the front and the rear wheel axle departure angles. $\theta_{wr-front}$ is denoted as the front wheel departure angle and $\theta_{wr-rear}$ is denoted as the rear wheel departure angle. The average of those two angles is used to define the wheel departure angle $\theta_{wr}$ $$\theta_{wr} = \frac{\theta_{wr-front} + \theta_{wr-rear}}{2}. \quad (7)$$

The assembly consists of the wheel, the tires and the suspensions. FIG. 4 shows the rear axle of such an assembly. In order to avoid solving the front lateral and vertical tire forces $F_{yf}$ and $F_{zf}$, the rear lateral and vertical tire forces $F_{yr}$ and $F_{zr}$, the equation of motion was written around the outer tire contact patch for front and rear assemblies $$I_{wfx}\ddot{\theta}_{wr} = (h-h_{cg})\cos(\theta_{bw})[S_{ylf} + S_{yrf}] - M_{uf}gl_w \cos(\theta_{bw}) + (S_{zlf} - S_{zrf})l$$

$$I_{wxr}\ddot{\theta}_{wr} = (h-h_{cg})\cos(\theta_{wr})[S_{ylr} + S_{yrr}] - M_{ur}gl_w \cos(\theta_{wr}) + (S_{zlr} - S_{zrr})l \quad (8)$$

where h is the distance between the vehicle body c.g. and the road surface when the car is parked; $I_{wxf}$ and $I_{wxr}$ are the roll moments of inertia of the front and rear wheel/tire/suspension assemblies around the contact patches of the outer tires; $M_{uf}$ and $M_{ur}$ are the total masses of the front and rear wheel/tire/suspension assemblies; $l_w$ is the half of the wheel track.

Up to now, vehicle states or motion variables were associated with the relative roll angles of interest. The goal is to connect the relative roll angles with the available sensor signals. In order to establish the connection, the sensor signals are related with those motion variables used to derive equations (3) and (8). First consider the lateral acceleration sensor output, which is denoted as $a_{y-sensor}$. The measured signal $a_{y-sensor}$ includes various components due to the vehicle yaw, longitudinal, and lateral motions and gravity, and it can be related to the lateral, longitudinal, yaw motion variables and the gravity, as in the following:

$$a_{y-sensor} = \dot{v}_y + \omega_z v_x - g \sin(\theta_{bw} + \theta_{wr}) \quad (9)$$

and the roll angular rate sensor output measures the same roll rate used before, i.e., $$\omega_{x-sensor} = \omega_x. \quad (10)$$

Plugging (9) into (5) leads to $$M_{susp-lat} = M_s h_{cg} a_{y-sensor}$$

$$S_y = M_s a_{y-sensor} \quad (11)$$

Therefore (3) can be simplified into $$\dot{\theta}_{bw} = -c_1 \theta_{bw} - c_2 \dot{\omega}_{x-sensor} + c_3 a_{y-sensor} \quad (12)$$

where the coefficients in the equation can be related to the vehicle parameters as in the following:

$$c_1 = -\frac{K_{roll}}{D_{roll}}, \quad c_2 = \frac{I_x}{D_{roll}}, \quad c_3 = \frac{M_s h_{cg}}{D_{roll}}.$$

Adding together the two equations in (8) and plugging (11) into the resultant equation leads to the following equation $$\ddot{\theta}_{wr} = -d_1 \cos(\theta_{wr}) + d_2 a_{y-sensor} \cos(\theta_{bw}) + d_3 \theta_{bw} + d_4 \dot{\theta}_{bw} \quad (13)$$

where the coefficients in the equation can be related to the vehicle parameters as $$d_1 = \frac{(M_{uf} + M_{ur})l_w}{I_{wxf} + I_{wxr}}g, \quad d_2 = \frac{M_s(h - h_{cg})}{I_{wxf} + I_{wxr}},$$

$$d_3 = \frac{K_{roll}}{I_{wxf} + I_{wxr}}, \quad d_4 = \frac{D_{roll}}{I_{wxf} + I_{wxr}}.$$

Based on (12) and (13), the angles of interests can be related to the two sensor signals $a_{y-sensor}$ and $\omega_{x-sensor}$. A digital algorithm using a Tyler expansion to the continuous time differential equation in order to obtain the digital version of the sensing algorithm can be used as in the following for estimating the relative roll angles $$\theta_{bw}(k+1) = \theta_{bw}(k) + \Delta T^* f(k)$$

$$x(k+1) = x(k) + \Delta T^* g(k)$$

$$\theta_{wr}(k+1) = \theta_{wr}(k) + \Delta T^* x(k) + \Delta T^{2*} g(k) \quad (14)$$

where $\Delta T$ is the sampling time of the implemented algorithm, x is an internal state variable for conducting the computation, f and g are calculated at each time step according to the following functional relationships $$f(k) = -c_1 \theta_{bw}(k) - c_2 \omega_{x-sensor}(k) + c_3 a_{y-sensor}(k)$$

$$g(k) = -d_1 \cos(\theta_{wr}(k)) + d_2 a_{y-sensor}(k)\cos(\theta_{bw}(k)) + d_3 \theta_{bw}(k) + d_4 \theta_{bw}(k). \quad (15)$$

The final roll angle of the vehicle with respect to the road surface can be calculated as $$\theta_{br} = \theta_{bw} + \theta_{rw}.$$

In a digital implementation, the previously known angles are iteratively used in the angle determinations. This reduces the overall number of processing steps which leads to faster results and ultimately leads to more control of the vehicle rollover condition.

Figure 6:
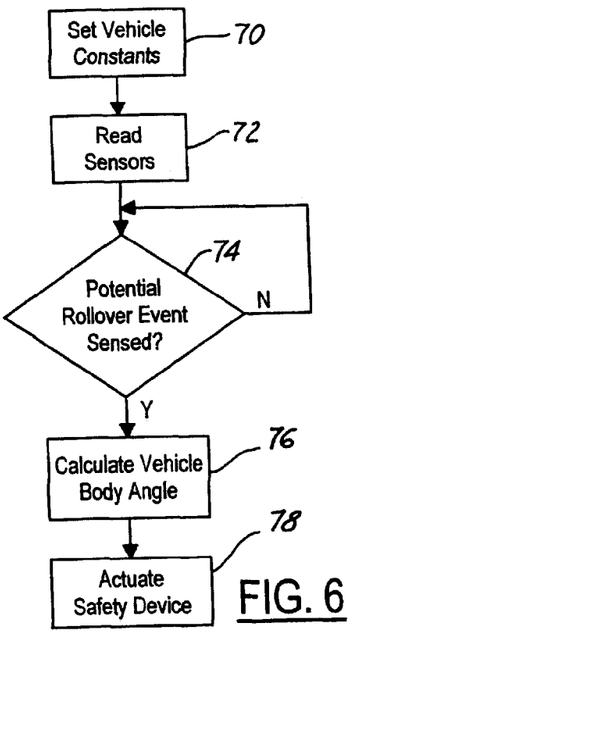
FIG. 6 is flow chart of determination according to the present invention.

Referring now to FIG. 6, a method for controlling an automotive vehicle as described above is now summarized. In step 70, the vehicle constants are determined. As described above, various vehicle constants are used in the present invention. The vehicle constants are determined during vehicle testing and vary with different suspensions and vehicle configurations. Such vehicle constants include suspension resultant roll stiffness $K_{roll}$ and roll damping rates $D_{roll}$, the height of the center of gravity of the vehicle, the masses of the vehicle including the inertial masses which include the roll moments of inertia of the front and rear wheel tire assemblies around the contact patches of the outer tires, and the total masses of the front and rear wheels/tires/suspension assemblies. In step 72 the various sensors are read. The various sensors may include sensors in FIG. 2. In step 74 a potential rollover event is sensed using the method as shown in Ford U.S. Pat. No. 6,356,188 or any other method. If a potential rollover is not sensed, step 74 repeats. That is, if a potential wheel lifting or wheel loading shift is not sensed, the present invention is not implemented. As described above, a rollover event that does not include lifting of the wheels or a load shift does not require the implementation of the present invention. The present invention is suitable during a potential rollover event in which the wheels are lifted or the load has shifted. In step 74, the vehicle body angle is determined as described above. The vehicle body angle is determined by using the roll angular rate sensor and the lateral accelerometer. Both the body angle $\theta_{br}$ with respect to the wheel axis and the angle of the axle $\theta_{wr}$ with respect to the road surface are determined. Based upon the sum of those two angles, step 76 activates the appropriate safety device. The present invention is particularly suitable for situations in which at least one of the wheels has lifted from the pavement or the load has significantly shifted to one side of the vehicle. In such situations more aggressive counter rollover measures may be implemented by such a system.

While particular embodiments of the invention have been shown and described, numerous variations and alternate embodiments will occur to those skilled in the art. Accordingly, it is intended that the invention be limited only in terms of the appended claims.

What is claimed is:

1. A system for controlling an automotive vehicle comprising:
    a lateral acceleration sensor generating a lateral acceleration signal;
    a roll angular rate sensor generating a roll angular rate signal; and
    a controller coupled to the lateral acceleration sensor and the roll angular rate sensor, said controller generating a body roll angle signal in response to the lateral acceleration signal, a wheel departure angle signal in response to the lateral acceleration signal and the roll angular rate signal and a final roll angle signal in response to the body roll angle signal and the wheel departure angle signal.

2. A system as recited in claim 1 further comprising a rollover event sensor generating a potential rollover signal.

3. A system as recited in claim 2 wherein said potential rollover signal is indicative of wheel lift.

4. A system as recited in claim 2 wherein said potential rollover signal is indicative of a load shift.

5. A system as recited in claim 2 wherein said controller generates the final roll angle signal when said potential rollover signal is greater than a predetermined level.

6. A system as recited in claim 1 further comprising a safety device, said controller controlling said safety device in response to said final roll angle signal.

7. A system as recited in claim 6 wherein said safety device comprises at least one of an active brake control system, an active rear steering system, an active front steering system, an active anti-roll bar system, and an active suspension system.

8. A method of controlling a vehicle comprising:
    sensing a potential rollover event;
    measuring a lateral acceleration of the vehicle;
    measuring a roll angular rate of the vehicle; and
    determining a vehicle body roll angle signal in response to the lateral acceleration, a wheel departure angle signal in response to the lateral acceleration and the roll angular rate and a final roll angle signal in response to the body roll angle signal and the wheel departure angle signal in response to the lateral acceleration and the roll angular rate.

9. A method as recited in claim 8 wherein determining a vehicle body roll angle signal comprises determining the vehicle body angle relative to a vehicle suspension.

10. A method as recited in claim 8 wherein determining a vehicle body roll angle signal comprises determining the vehicle body angle relative to an axle.

11. A method as recited in claim 8 wherein determining a vehicle body roll angle signal comprises determining the vehicle body roll angle signal based on the lateral acceleration, the roll angular rate and a roll inertia of the wheel, tire and suspension assembly about a contact patch of a tire.

12. A method as recited in claim 11 wherein determining the vehicle body roll angle signal based on the lateral acceleration and the roll angular rate and the roll inertia of the wheel, tire and suspension assembly about a contact patch of the tire comprises determining the vehicle body angle signal based on the lateral acceleration, the roll angular rate and a sum of a front roll inertia of the wheel, tire and suspension assembly about a first contact patch of a front tire and a rear roll inertia of the wheel, tire and suspension assembly about a second contact patch of a rear tire.

13. A method as recited in claim 8 wherein determining a vehicle body angle comprises determining the vehicle body roll angle in response to a mass of a front and a rear wheel, tire and suspension assemblies.

14. A method as recited in claim 8 wherein sensing a potential rollover event comprises sensing wheel lift.

15. A method as recited in claim 8 wherein sensing a potential rollover event comprises sensing a shift in wheel loading.

16. A method of controlling a vehicle comprising:
    sensing a potential rollover event by sensing a wheel loading shift or wheel lift;
    measuring a lateral acceleration of the vehicle;
    measuring a roll angular rate of the vehicle;
    determining a vehicle body roll angle relative to an axle of the vehicle base upon the lateral acceleration and the roll angular rate; and
    determining a wheel departure angle based upon the vehicle body roll angle, the lateral acceleration, the roll angular rate and the roll inertia of the wheel, tire and suspension assembly about a tire contact patch of the vehicle; and determining a final roll angle in response to the wheel departure.

17. A method as recited in claim 16 wherein determining a wheel departure angle based on the vehicle body roll angle, lateral acceleration, the roll angular rate and the roll inertia of the wheel, tire and suspension assembly about a contact patch of the tire comprises determining the wheel departure angle based on the lateral acceleration, the vehicle body roll angle, the roll angular rate and a sum of a front roll inertia of the wheel, tire and suspension assembly about a first contact patch of a front tire and a rear roll inertia of the wheel, tire and suspension assembly about a second contact patch of a rear tire.

* * * * *